(12) United States Patent
 Caspers et al.

(10) Patent No.: US 10,983,370 B2
(45) Date of Patent: Apr. 20, 2021

(54) OPTICAL BIPOLAR PHASE SHIFTER

(71) Applicant: Robert Bosch GmbH, Stuttgart (DE)

(72) Inventors: Jan Niklas Caspers, Stuttgart (DE); Mohamed Ashour, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/745,844

(22) Filed: Jan. 17, 2020

(65) Prior Publication Data

US 2020/0233240 A1    Jul. 23, 2020

(30) Foreign Application Priority Data

Jan. 21, 2019   (DE) .......................... 102019200687.6

(51) Int. Cl.
 *G02F 1/025* (2006.01)
(52) U.S. Cl.
 CPC .......... *G02F 1/025* (2013.01); *G02F 2203/50* (2013.01)
(58) Field of Classification Search
 CPC ............................ G02F 1/025; G02F 2203/50
 See application file for complete search history.

(56) References Cited

U.S. PATENT DOCUMENTS

| | | | |
|---|---|---|---|
| 7,085,443 B1* | 8/2006 | Gunn, III | G02F 1/025 359/245 |
| 9,971,173 B2 | 5/2018 | Manouvrier | |
| 2018/0210242 A1 | 7/2018 | Baehr-Jones et al. | |
| 2020/0133091 A1* | 4/2020 | Oh | G02B 6/1347 |

OTHER PUBLICATIONS

Soref & Bennett: "Electrooptical Effects in Silicon", IEEE J. of Quantum Electronics, QE-23 (1), (1987), pp. 123-129.
Ogwaga, et al.: "Silicon-Based Phase Shifters for High Figure of Merit in Optical Modulation" Proc. of SPIE vol. 9752, (2016), pp. 975202-1-975202-7.
Graham T. Reed, et al., "Recent Breakthroughs in Carrier Depletion Based Silicon Optical Modulators", Nanophotonics, 2013, p. 229-245.
Xia Chen, et al., "Toward an Optical FPGA—Programmable Silicon Photonic Circuits", ARXIV, 2018.
Firooz Aflatouni, et al., "Nanophotonic Projection System", vol. 23, No. 16, 2015, p. 1-11.
Jessie Rosenberg, et al., "A 25 GBPS Silicon Micro Ring Modulator Based on an Interleaved Junction", vol. 20, No. 24, 2012, p. 1-13.
Zhi-Yong Li, et al., "Silicon Waveguide Modulator Based on Carrier Depletion in Periodically Interleaved PN Junctions", Optics Express, 2009, vol. 17, No. 18, p. 1-12.
W.D. Sacher, et al., "Monolithically Integrated Multilayer Silicon Nitride-on-Silicon Waveguide Platforms for 3-D Photonic Circuits and Devices", Proceeding of IEEE. vol. 106, No. 12, 2018, p. 2232-2245.

* cited by examiner

*Primary Examiner* — Sung H Pak
(74) *Attorney, Agent, or Firm* — Norton Rose Fulbright US LLP; Gerard Messina

(57) ABSTRACT

An optical phase shifter is described, which includes an optical waveguide which is realized in a substrate and has an optical conduction surface within the substrate, the optical conduction surface including at least a first region having a first doping and at least two second regions having a second doping that differs from the first doping. The first region is situated between the two second regions.

9 Claims, 4 Drawing Sheets

OPTICAL BIPOLAR PHASE SHIFTER

CROSS REFERENCE

The present application claims the benefit under 35 U.S.C. § 119 of German Patent Application No. DE 102019200687.6 filed on Jan. 21, 2019, which is expressly incorporated herein by reference in its entirety.

FIELD

The present invention relates to an optical phase shifter, which includes an optical waveguide which is realized in a substrate and has an optical conduction surface inside the substrate.

BACKGROUND INFORMATION

An optical phase shifter is a key component in integrated photonics. Optical phase shifters are indispensable in the optical communication, in particular. Here, for example, they are used for modulating the optical radiation within the framework of information encoding, which is described in "Recent Breakthroughs in Carrier Depletion Based Silicon Optical Modulators", Nanophotonics, 2013, by Graham T. Reed, for example. Optical phase shifters are also used as switches for programmable integrated phototonic chips of the type described by Xia Chen in the article "Toward an Optical FPGA—Programmable Silicon Photonic Circuits", ArXiv, 2018, for instance. In addition, optical phase shifters are provided in beam-control applications, which was described in greater detail by Firooz Aflatouni et. al. in the article "Nanophotonic Projection System", for example.

One common method for realizing optical phase shifters is to create a horizontal and/or vertical semiconductor diode junction in an optical waveguide. In a few cases, the dopants are periodically distributed across the optical propagation direction (beam propagation direction: BPD) in a repeating manner (see Jessie Rosenberg, "A 25 Gbps Silicon Micro Ring Modulator Based on an Interleaved Junction", 2012). This allows the voltage-dependent free charge region (depletion region) of the diode junction to be used for shunting charges either out of the optical conduction surface of an integrated optical waveguide (i.e., for depleting the optical conduction surface) or for injecting charges into this optical conduction surface. The modulation of the charge density changes the refractive index of the silicon as a result of the free carrier effect (also known as the indirect electro-optical effect of silicon).

When the charge density in the silicon increases, the photons that propagate or move through the silicon are more susceptible to an annihilation by the foreign atoms that bring about the doping. This is also referred to as an optical absorption loss. Since the absorption is imaged by the imaginary component of the complex optical refractive index, the use of the Krammer-Kronig analysis on the imaginary component makes it possible to also estimate the real component—i.e., the refractive index—under consideration of specific mathematical conditions. In this case, the refractive index determines the optical path length and finally, the optical phase shift.

Soref and Bennett describe the dependence of the real and imaginary components of the refractive index of silicon on the charge carrier density (holes and electrons) within the doped silicon ("Electrooptical Effects in Silicon", IEEE Journal of Quantum Electronics, 1987). Using empirical data for the optical absorption in silicon, they came to the conclusion that electro-optical effects are able to be achieved in doped silicon. Put another way, they describe the relationship of the real and the imaginary component of the complex refractive index as a function of the impurity level in silicon. The real component is responsible for the phase shift, while the imaginary component is the source of the losses. The number of impurities is able to be varied as a function of the applied voltage, either by reducing charges from the depletion zone of the PN-type junction (depletion of the PN-type junction) or by injecting charges into the intrinsic region of a PIN diode.

It is noticeable here that losses occur in the presence of doped impurities regardless of an applied voltage. A change in the phase shift, on the other hand, is present only when a voltage is applied. This means that all doped impurities that lie in the movement path of photons and do not change as a function of the applied voltage represent a source of inefficiencies. The reason for this inefficiency is the existence of losses during which no modulatable phase shift is generated.

Different methods for minimizing this previously described inefficiency have been introduced in multiple papers. Many of the previously mentioned methods made the attempt of maximizing the overlap between the optical mode and the voltage-dependent charge region using different doping conditions, layouts and strategies. Since the width of this region is controlled by the applied voltage, many of the earlier papers have focused on enlarging the length of the semiconductor-semiconductor junction between the regions doped with donors or with acceptors. For example, this was realized by a switch of the previously mentioned juncture in the lateral or vertical direction, see Graham T. Reed: "Recent Breakthroughs in Carrier Depletion Based Silicon Optical Modulators", Nanophotonics, 2013.

One interesting current paper presents a vertical U-shaped doping profile (see W. D. Sacher: "Monolithically Integrated Multilayer Silicon Nitride-on-Silicon Waveguide Platforms for 3-D Photonic Circuits and Devices", Proceedings of the IEEE, 2018). The idea of this paper is to enlarge the overlap between the optical mode and the free charge carriers using a precisely formed vertical doping profile. Commercial technology vendors in the field of integrated photonic chips normally do not offer such methods. Instead, these vendors offer methods of limited accuracy, which makes them unsuitable for use in mass production (see Kensuke Ogwaga: "Silicon-Based Phase Shifters for High Figure of Merit in Optical Modulation", SPIE OPTO, 2016).

Another approach consists of the addition of a field of (PN) junctions perpendicular to the propagation direction of the light, i.e., perpendicular to the BPD. This is also known as an "interleaved phase shifter" and in practice reduces the electric response rate of the optical phase shifter since the junctions add capacities. In addition, this also increases the total overlap of the optical mode with the zone of the free charges. In this regard, the total number of junctions is limited by the minimum area of the doping window specified by the technology (Zhi-Yong Li: "Silicon Waveguide Modulator Based on Carrier Depletion in Periodically Interleaved PN Junctions", Optics Express, 2009).

All depletion and charge carrier injection methods are based on two metal lines for the input voltage for reducing free charges in the optical path (i.e., to enlarge the depletion) or for injecting them. The metal contacts of the first layer are always situated on the sides of the waveguide. This leads to a reduction in the optical loss in the waveguide.

All electro-optical phase shifters using a charge carrier injection or depletion approach experience a loss-phase shift tradeoff. In solutions from the related art, only one lateral PN junction or more than one PN junction is used in a system that is interleaved along the beam propagation direction of the waveguide. The previously mentioned optical waveguides thus have either one lateral junction or more than one junction in an interleaved arrangement along the propagation direction of the waveguide. Doped carriers that are not controlled by a voltage form a loss source in this case. Simulations indicate that the current solutions from the related art are not yet optimal for the previously mentioned problem.

SUMMARY

According to the present invention, an example optical conduction surface has at least one first region having a first doping and at least two second regions each having a second doping that differs from the first doping, the first region being situated between the two second regions. This advantageously allows for an efficient phase change. The efficiency of the optical phase shifter is advantageously increased as a result and the linearity of the optical phase shifter is improved.

An optical phase shifter in particular is to be understood as an electro-optical phase shifter. A substrate is particularly to be understood as a semiconductor material. The substrate in particular includes silicon or is made up of silicon.

An optical conduction surface in particular describes an optically conductive surface within the substrate, which has a plurality of differently doped regions and thus is electrically actuable or controllable.

A region in particular is meant to be understood as a subregion of the substrate.

Doping in particular describes n-type doping, n+-type doping, p-type doping, or p+-type doping.

In one further development of the present invention, it is provided that the three regions are disposed in alternation with respect to one another along a direction perpendicular to the beam propagation direction. Thus, the three regions are especially disposed in alternation within the optical conduction surface in such a way that at least two material junctions that have opposite doping in each case are formed in a direction perpendicular to the beam propagation direction. The previously mentioned material junctions preferably also extend along a direction that runs parallel to the beam propagation direction. This advantageously allows for an efficient phase change.

In one further development according to the present invention it is preferably provided that the three regions extend at least partially within the optical conduction surface along the beam propagation direction. This advantageously allows for an efficient phase change. Because of the above-described solution, which includes a double junction (which may also be referred to as a "bi-junction approach"), the efficiency of the waveguide thus is increased. This specifically means that the percentage share of free charge carriers resulting from doped impurities, which are therefore able to move freely within the waveguide, is greater in comparison to earlier implementations. This in turn contributes to greater linearity of the device and allows for the achievement of a complete 180° phase shift at much lower voltages.

In another further development according to the present invention, it is provided that the first region overlaps with at least one of the second regions along a direction perpendicular to the beam propagation direction and/or that the first region abuts at least one of the second regions along a direction perpendicular to the beam propagation direction.

As a result, the first region is preferably in contact or in touch with at least one of the second regions along a direction perpendicular to the beam propagation direction. This advantageously provides an optical phase shifter which is relatively easy to realize yet still efficient.

The first doping is preferably a p-type doping, and the second doping is an n-type doping. In one alternative, also preferred development, the first doping is an n-type doping and the second doping is a p-type doping. The three regions thus preferably form an N-P-N junction or a P-N-P junction.

In one preferred further development of the present invention, it is provided that at least one area having an intrinsic charge carrier density is situated between the first region and at least one of the second regions. This preferably smooths the profile of the electrical field, thereby advantageously allowing for an efficient phase change.

In another further development of the present invention, the area having an intrinsic charge carrier density extends continuously along the first region and the at least one of the second regions along a direction extending parallel to the beam propagation direction. In one preferred further development of this embodiment, it is provided that a further area having an intrinsic charge carrier density extends continuously along the first region and the other of the at least one of the second regions along a direction extending parallel to the beam propagation direction. In this embodiment, the three regions thus preferably form a N-I-P-I-N structure or a N-I-P-I-N junction with the previously mentioned two areas having an intrinsic charge carrier density. In another, alternative embodiment, the three regions with the previously mentioned two areas having an intrinsic charge carrier density thus furthermore preferably form a P-I-N-I-P-structure or a P-I-N-I-P junction. This advantageously allows for an efficient phase change, and the profile, i.e., the characteristic of the electrical field, becomes even smoother.

In one further development of the present invention, it is preferably provided that a plurality of areas having an intrinsic charge carrier density extend along a direction running parallel to the beam propagation direction at a distance from one another along the first region and the at least one of the second regions. As a result, there are preferably clearances situated between the plurality of areas having an intrinsic charge carrier density, which thus means that they form islands having an intrinsic charge carrier density. This advantageously allows for an even more efficient phase change.

In one further preferred development of the present invention, it is provided that the optical phase shifter also includes at least two electrical connections to which a voltage is able to be applied, and the connections are connected to at least one of the three regions in an electrically conductive manner in each case. This makes the two junctions electrically actuable and controllable. It is furthermore preferred that the optical phase shifter has three electrical connections to which a voltage is able to be applied, each of the three electrical connections being connected to one of the three regions in an electrically conductive manner. In such an embodiment, the two junctions are able to be electrically actuated and controlled in a particularly satisfactory manner.

In addition, the embodiment of the present invention preferably includes a doped optical junction element via which the first region is linked to one of the electrical connections. Thus, an optical junction is preferably used for contacting the doping region. Adding a metal contact directly over a photonic waveguide would considerably increase the optical losses of the optical waveguide during the signal transmission. According to the above preferred embodiment, improved contacting is therefore possible because a doped optical junction element is provided.

In contrast to electrical signals routed through metal, conducted (light) waves are actually conducted in two directions within a suitable material. Optical junctions are structures that utilize this idea in the area of integrated photonic circuits, in which an optical signal or multiple optical signals is/are conveyed to an optical device, in particular of the optical phase shifter, having a plurality of connections. Depending on the device geometry or the structure of the optical device or the optical phase shifter, these signals are then guided or routed to different outputs of the optical device, i.e., the optical phase shifter. According to one preferred embodiment, a doped optical junction element is thus provided, which is linked or connected to an input or port of the optical phase shifter. The optical signal is preferably fed into the particular input or port to which the doped optical junction element is connected as well. In addition, the optical signal is preferably fed into one other input or multiple other inputs or ports of the optical phase shifter to which the doped optical junction element is not connected, or put another way, the optical signal is routed through the other inputs or ports. The doped optical junction element having the three regions is preferably also doped, that is to say, the doping of the three regions, but at least of the first region, is continued also in the optical junction element and brought or guided through the inputs or ports in order to achieve an electrical linkage to the more highly doped regions. In this way, one of the electrical connections is connected to the highly doped region or to at least one of the doped regions.

In an additional further development of the present invention, it is provided that at least one of the three regions has a serpentine-type characteristic along a direction that extends parallel to the beam propagation direction. This advantageously increases the total length of the junctions.

In addition, an example LIDAR system, i.e., a light detection and ranging system having an optical phase shifter according to the present invention, is made available.

BRIEF DESCRIPTION OF THE DRAWINGS

Exemplary embodiments of the present invention are described in greater detail with the aid of the drawing and elucidated in greater detail in the following description.

DETAILED DESCRIPTION OF EXAMPLE EMBODIMENTS

Figure 1:
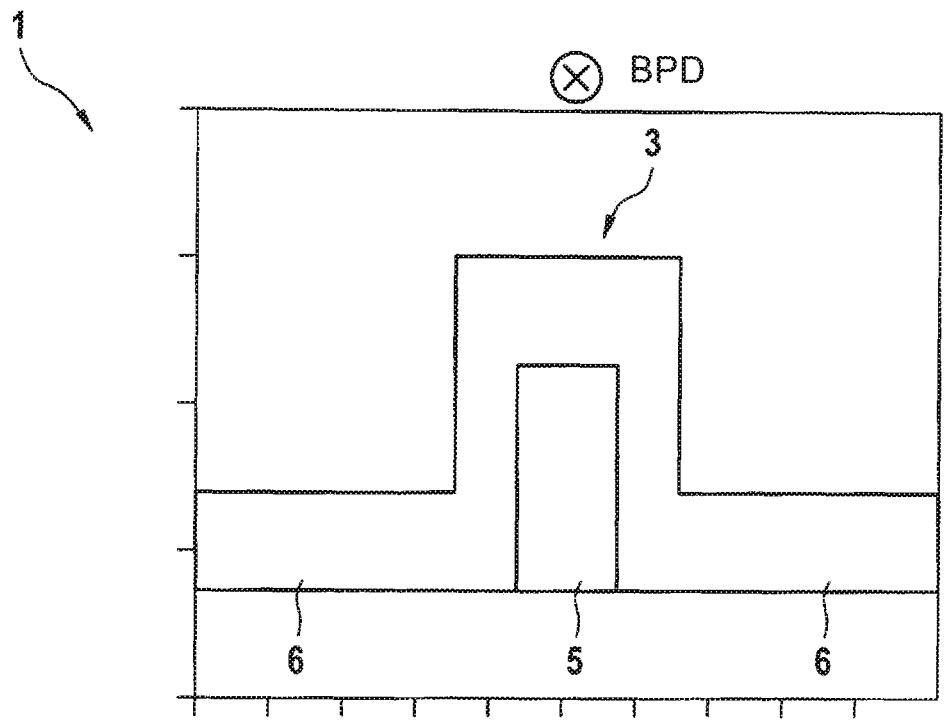
FIG. 1 shows a schematic illustration of the N-P-N doping of a first exemplary embodiment of an optical phase shifter according to the present invention.

FIG. 1 shows a schematic illustration of the N-P-N doping of a first exemplary embodiment of an optical phase shifter 1 according to the present invention. Described more specifically, FIG. 1 shows a cross-section through the N-P-N structure of this first exemplary embodiment of an optical phase shifter 1 according to the present invention, the cross-section having been implemented perpendicular to the beam propagation direction BPD. The line of view of a viewer of FIG. 1 thus runs parallel to the BPD. In this first exemplary embodiment, optical phase shifter 1 includes an optical waveguide 3, which is realized in a substrate and has an optical conduction surface within the substrate. In this exemplary embodiment, the substrate includes silicon purely by way of example, but it may also include any other material. Simply by way of example, the optical conduction surface in this first exemplary embodiment has a first region 5 having a first doping and two second regions 6 having a second doping, which differs from the first doping, first region 5 being situated between the two second regions 6.

In this first exemplary embodiment, first region 5 is p-doped simply by way of example, and the two second regions 6 are n-doped purely by way of example. However, this may of course also be reversed. In other exemplary embodiments, first region 5 may thus also be n-doped while the two second regions 6 are p-doped. Similar to FIG. 1, the three regions 5, 6 extend along the BPD. On the right in FIG. 4, this is illustrated in a plan view of the first exemplary embodiment, shown in cross-section in FIG. 1, of an optical phase shifter 1 according to the present invention, while the three regions 5, 6 and their alignment along the BPD are particularly easy to see in the cutaway shown on the right in FIG. 4 or in the enlargement shown on the right in FIG. 4. In their respective contact regions, the three regions 5, 6 form a PN-type junction in each case, which extends parallel to the BPD of optical waveguide 3, or in other words, a total of two PN-type junctions, which extend parallel to the BPD of optical waveguide 3 in each case.

Put another way, the structure of optical phase shifter 1 according to the present invention includes an optical waveguide 3. The optical conduction region of this optical waveguide 3 is provided with three differently-doped doping areas along the cross-sectional direction, i.e., orthogonal to the propagation direction of the light (the BPD is indicated by an arrow on the right side in FIG. 4). Since the doping is provided along the length of optical waveguide 3, the boundary between two respective doping areas form a junction in each case, more specifically a respective PN-type junction, due to the charge carrier diffusion, which is situated parallel to the optical propagation direction, i.e., parallel to the BPD within the substrate in each case. In other words, first region 5 forms a first PN-type junction with second region 6 disposed to the left of it, and it forms a second PN-type junction with second region 6 disposed to the right of it. The doped regions, i.e., the three regions 5, 6, may overlap one another or may have mutually fitting, i.e., mutually abutting, side regions or side surfaces, i.e., be in contact with one another, or else have an area having an intrinsic charge carrier density as an interposed gap in each case; see FIG. 2 and the associated description further down in the text.

Each doping area, i.e., each of the three regions 5, 6, is electrically contacted. The doped center region, i.e., first region 5, is contacted by optical waveguide 3 either directly via its upper surface or via its sides, but it may alternatively also be connected to an electrical connection, as in the case of the first exemplary embodiment illustrated in FIGS. 1 and 4, with the aid of a doped optical junction element, i.e., with the aid of a doped optical junction, which will be described in greater detail in the following text in connection with FIG. 4.

A main feature of the invention presented here thus is the enlargement of the overlap between the region of controllable free charges and the optical mode output. This is a direct consequence of the use of a structure having three doping regions, i.e., the previously mentioned three regions 5, 6, within optical waveguide 3, because it has two PN-type junctions, which are controllable by two voltages, rather than by only a single voltage, as in the solutions of the related art. The introduced structure bears great similarity to a transistor having two junctions (that is to say, to a "bi-junction transistor"), and thus has two junctions in which the free charges are able to be controlled with the aid of electrical voltages.

Figure 2:
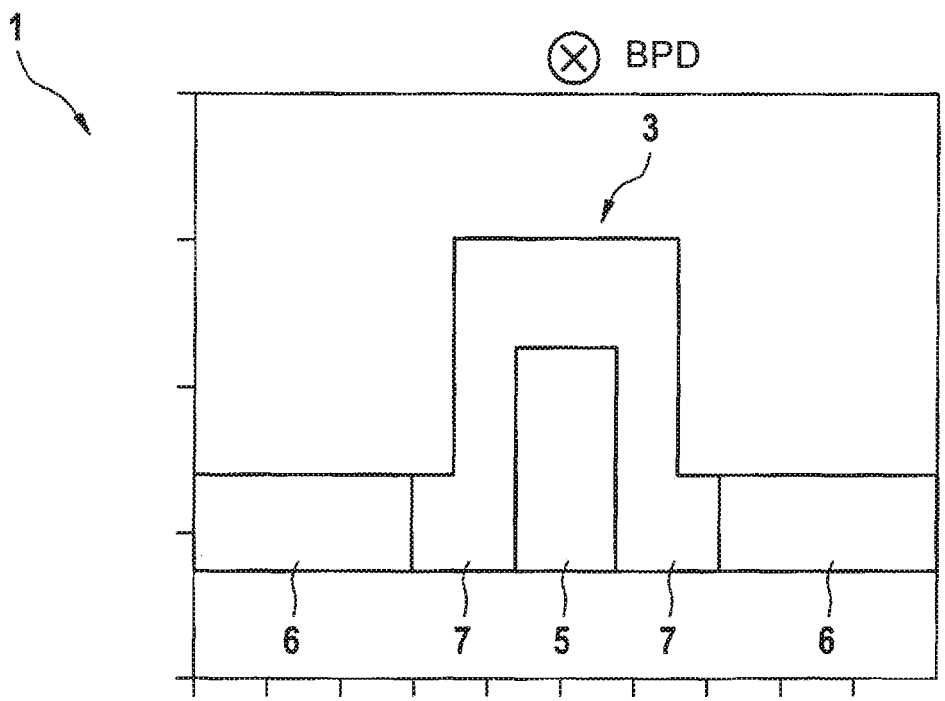
FIG. 2 shows a schematic illustration of the N-I-P-I-N doping of a second exemplary embodiment of an optical phase shifter according to the present invention.

FIG. 2 shows a schematic illustration of the N-I-P-I-N doping of a second exemplary embodiment of an optical phase shifter 1 according to the present invention. The above description in the context of FIG. 1 with regard to the first exemplary embodiment also applies to the second exemplary embodiment, which is described in the following text in the context of FIG. 2. The second exemplary embodiment differs from the first exemplary embodiment simply in that, between a second region 6 and first region 5, an area having an intrinsic charge carrier density 7 extends along a direction extending parallel to beam propagation direction BPD in a continuous manner along first region 5 and respective second regions 6 in each case. In this second exemplary embodiment, left second region 6 thus does not touch first region 5 but is linked to first region 5 via an area having an intrinsic charge carrier density 7. Right second region 6 in this second exemplary embodiment does not touch first region 5 either but is linked to first region 5 via a further region having an intrinsic charge carrier density 7. In other words, the previously described two areas having an intrinsic charge carrier density 7 extend in space along the BPD, i.e., parallel to the three regions 5, 6.

Figure 3:
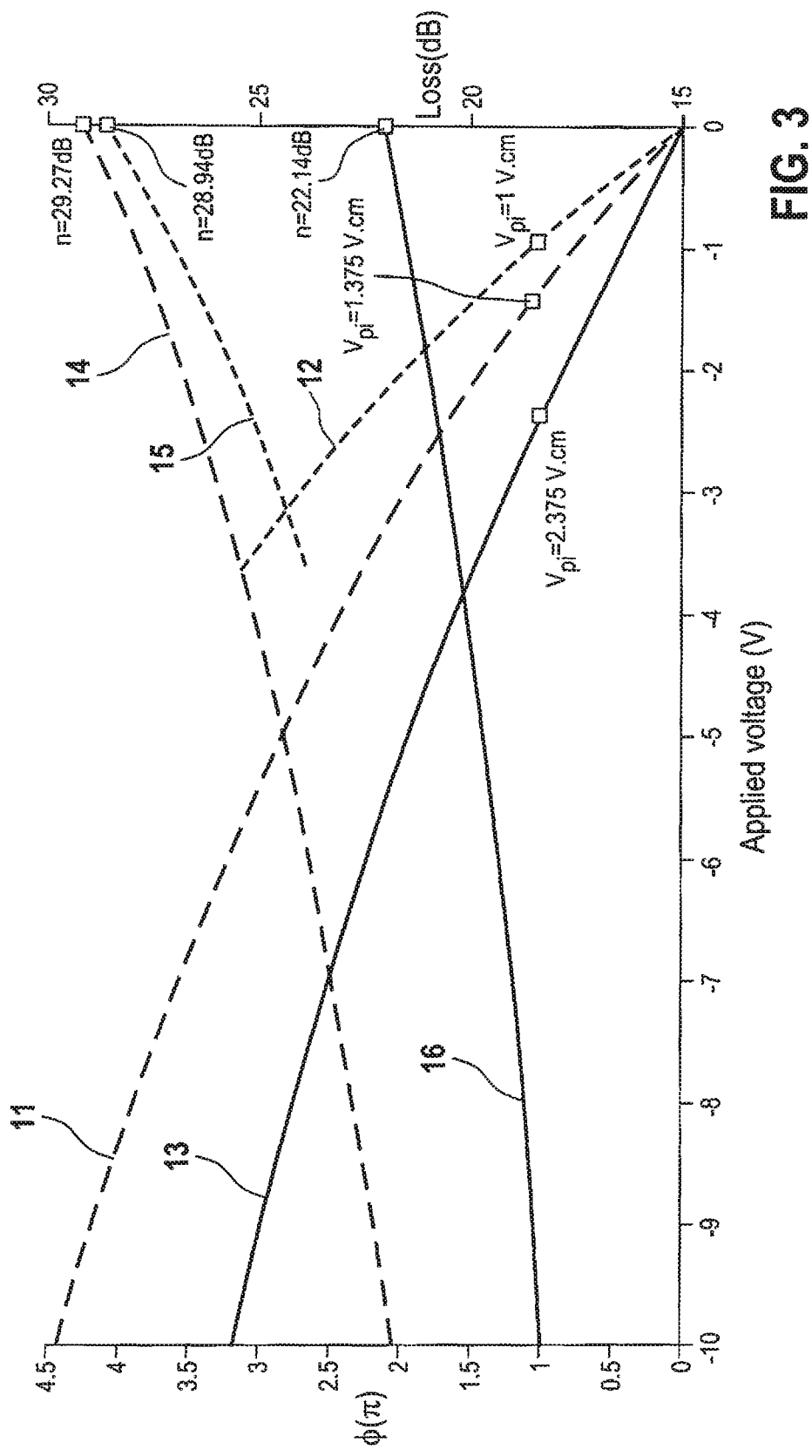
FIG. 3 shows a comparison of the estimated losses as well as the estimated phase shift as a function of the voltage for an optical phase shifter having NP-type doping of the related art and for optical phase shifters developed according to the present invention in each case.

FIG. 3 shows a comparison of the estimated losses as well as the estimated phase shift as a function of the voltage for an optical phase shifter having NP-type doping of the related art and for optical phase shifters 1 developed according to the present invention. Described more specifically, the diagram shown in FIG. 3 illustrates the result of a numerical simulation. In this simulation, optical phase shifter 1 was purely exemplarily calculated as one possible realization using a length of 1 cm, an optical conduction region in silicon having a width of 600 nm and a height of 220 nm. Plotted on the abscissa of the diagram shown in FIG. 3 is the voltage, while the phase shift $\phi(\Pi)$ is plotted on the left ordinate, and the loss in decibels (dB) is plotted on the right ordinate. The previously mentioned dimensions have been selected purely by way of example. Any other dimensions may be chosen as well without any detrimental effect on the functionality of an optical phase shifter.

A common quality index for optical phase shifters is the $V_{\Pi}L$ number. It corresponds to the particular voltage required at a certain given length of the optical phase shifter in order to achieve a complete 180° phase shift.

For example, if $V_{529}L=1V\cdot cm$, then this means that in an optical phase shifter produced with a length of 1cm, the optical phase shift of the output signal of the optical phase shifter amounts to 180° if a voltage of 1V is applied as the input potential. The phase shift $\phi(\Pi)$ as a function of the voltage for an optical phase shifter having only one PN-type junction of the related art is described by curve 11. Curve 12 describes the previously mentioned correlation for an exemplary embodiment of an optical phase shifter having an N-P-N junction according to the present invention, while curve 13 represents this correlation for an exemplary embodiment of an optical phase shifter according to the present invention having an N-I-P-I-N junction.

As may be gathered from FIG. 3, the optical phase shifters having the N-P-N structure achieve a $V_{\Pi}L$ value of 1V·cm (see FIG. 3, curve 13). In contrast, an optical phase shifter having only a PN-type junction of the related art, simulated using the same doping parameters and using optimized doping windows, achieves a $V_{\Pi}L$ value of 1.375V·cm in the simulations (see FIG. 3, curve 11).

As a result, the phase shifter has an effectiveness in its key function that is increased by 40%. In addition, the loss of 29.3 dB is reduced to 29 dB. Curve 14 in FIG. 3 shows the loss of the optical phase shifter from the related art having a PN junction as a function of the applied voltage, curve 15 of FIG. 3 shows the loss of the optical phase shifter having the N-P-N structure as a function of the applied voltage, and curve 16 of FIG. 3 shows the loss of the optical phase shifter having the N-I-P-I-N structure as a function of the applied voltage.

In this exemplary embodiment, the optical phase shifter according to the present invention has three connections. The two N-type doped areas have been grounded for the simulation of the optical phase shifters having an N-P-N structure, while the P-type area is connected to a negative voltage source. The potential of the optical phase shifter thus corresponds to the particular voltage that is applied to the center region. In order to simulate real physical conditions as best as possible, impact ionization models (also known as breakdown models) are added to the simulation. For this reason, the phase shift as well as the losses in FIG. 3 in the N-P-N implementation are shown only for potentials of up to 4V (see curve 12 in FIG. 3). At this point, the electrical field in the depletion regions of the two junctions becomes sufficiently large. The kinetic energy of the free charge carriers is once again large enough to release other bound charge carriers from the grid of the substrate. In response, the number of free charge carriers suddenly increases exponentially. This breakdown state is considered to be the upper limit of the operating range of the applied potential of a given optical phase shifter. The main reason for this phenomenon is the high value of the created electrical field within small regions of the optical phase shifter. The corresponding electrostatic force then charges the free charge carriers with high kinetic energy.

As a matter of principle, it is possible to expand the working range of the optical phase shifter, for instance by delaying the occurrence of the impact ionization phenomenon by developing the electrical field in such a way that the spatial gradient of the electrical field becomes smoother relative to the cross-section of the optical phase shifter. It is interesting at this point to apply such smoothing of the gradient or such a method for delaying the breakdown in the provided N-P-N implementation. In the case of the provided N-P-N implementation, the smoothing of the electrical field profile is able to be realized by the addition of intrinsic areas, i.e., regions or areas having an intrinsic charge carrier density 7, between the doped regions, i.e., between the three regions 5, 6. This in turn reduces the total number of free charges in the equilibrium as well as possibly beginning losses.

The doping cross-section with intrinsic areas or regions, i.e., the doping in the case of an optical phase shifter having an N-I-P-I-N structure, is shown in FIG. 2, and the corresponding N-I-P-I-N results are illustrated in FIG. 3 (see curve 13 for the phase shift and curve 16 for the losses in an N-I-P-I-N doping). As a rule, a drop in the induced phase shift would have to be expected if intrinsic areas or regions were added between the three regions, in particular as a result of the low total number of free charge carriers.

This is illustrated in FIG. 3 because a full Π-phase shift (i.e., a phase shift of 180°) is possible only at 2.3V (see curve 13). The loss (see curve 16) is reduced by 30% in comparison to the NP counterpart (see curves 11 and 14) of the related art.

This is of particular importance for applications that have a low frequency switchover and optical phase arrays. For example, this lower loss may lead to a 30% increase in the range of a LIDAR system.

Figure 4:
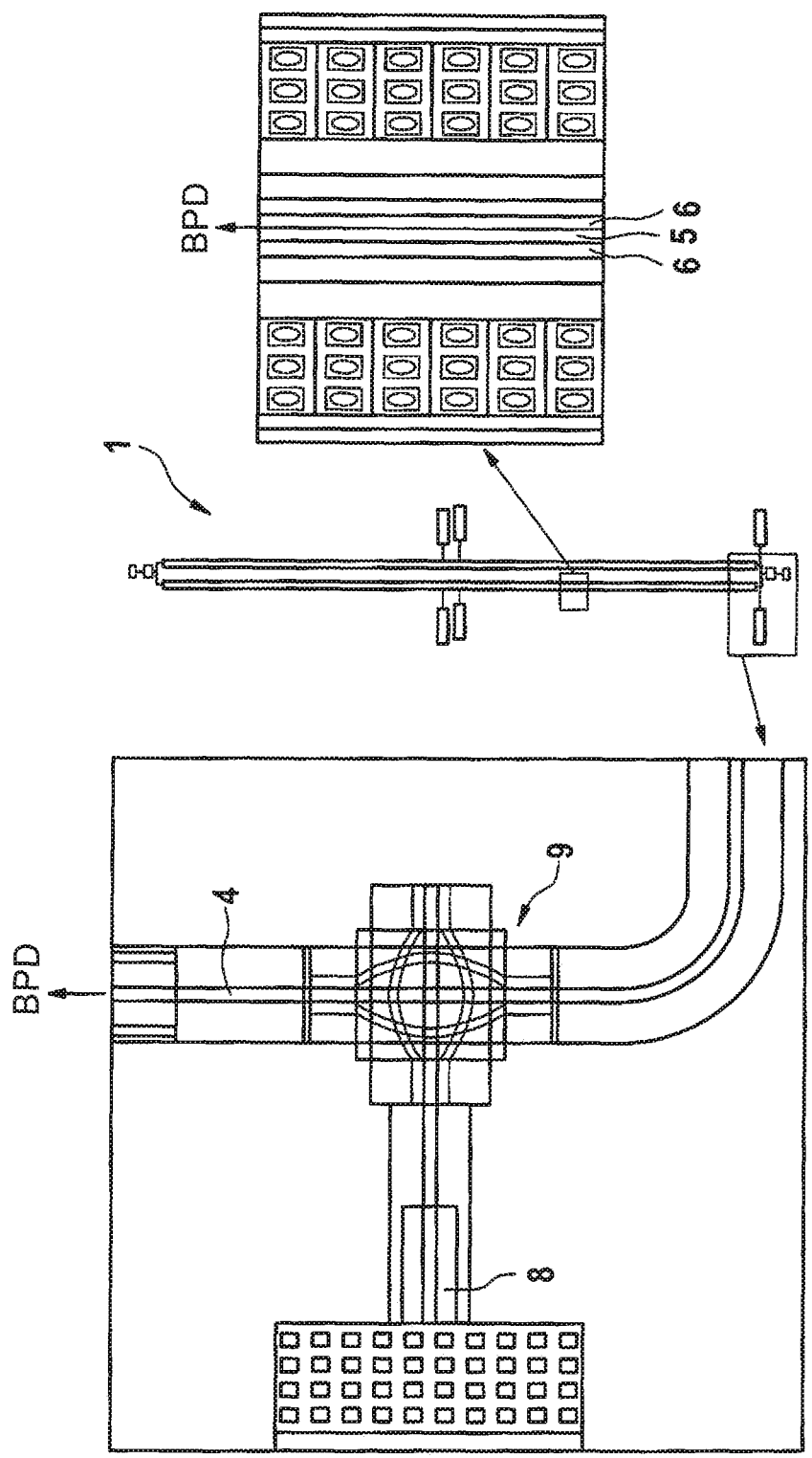
FIG. 4 shows a schematic illustration of different plan views of a third exemplary embodiment of an optical phase shifter.

FIG. 4 shows a schematic illustration of different plan views of a third exemplary embodiment of an optical phase shifter 1. As already mentioned earlier in the text, optical phase shifter 1 illustrated in FIG. 4 has the same doping, i.e., the same three regions 5, 6, as the first exemplary embodiment illustrated in FIG. 1 and described above. These regions 5, 6, shown on the right in FIG. 4, and their placement with regard to the BPD were already sufficiently described in connection with FIG. 1.

However, the third exemplary embodiment shown in FIG. 4 additionally includes a doped optical junction element 9, via which first region 5 is connected to one of electrical connections 8. In this third exemplary embodiment, the efficiency of optical phase shifter 1 is therefore not compromised by a metal contacting that is situated directly above the optical waveguide, for example, so that the optical losses are considerably lower in the signal transmission with the aid of optical phase shifter 1 according to the present invention.

This doped optical junction element 9 thus is a doped optical junction, which is connected in an electrically conductive manner to a doped surface 4 that is used for electrically linking an electrical connection 8 of optical phase shifter 1 to the center surface, i.e., to first region 5 of optical waveguide 3. Doped optical junction element 9 connects doped optical waveguide 3 to electrical connection 8, in particular via doped surface 4.

For this purpose, doped optical junction element 9 in this third exemplary embodiment is purely exemplarily doped by the three regions, which means that the doping of the three regions 5, 6 is continued also in doped optical junction element 9 and brought or routed through the inputs or ports in order to achieve an electrical connection to the more highly doped regions. In this way, electrical connection 8 is linked to doped optical junction element 9, which in turn realizes the linkage of electrical connection 8 to the three doped regions 5, 6 of optical phase shifter 1.

The three regions 5, 6 and their alignment along the BPD are shown on the right in FIG. 4.

Figure 5:
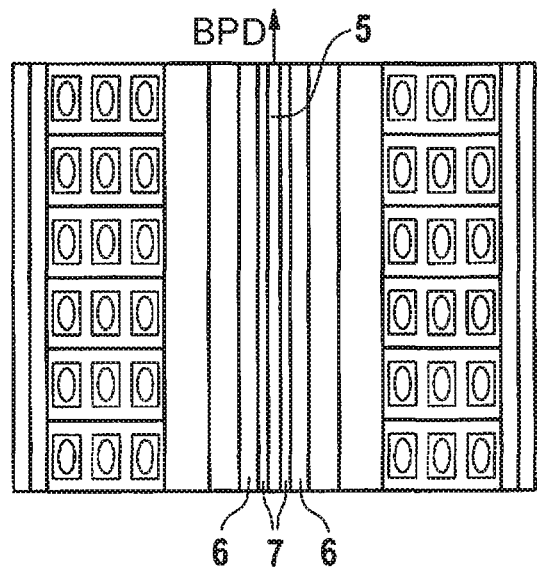
FIG. 5 shows a schematic illustration of a plan view of the exemplary embodiment shown in FIG. 2 of an optical phase shifter having N-I-P-I-N doping according to the present invention.

FIG. 5 shows a schematic representation of a plan view of the second exemplary embodiment of an optical phase shifter having an N-I-P-I-N doping illustrated in FIG. 2. The areas having an intrinsic charge carrier density 7 are situated between outer second regions 6 and inner first region 5 in each case. Outer second regions 6 in this second exemplary embodiment are n-doped purely by way of example, while inner first region 5 is p-doped purely by way of example.

Figure 6:
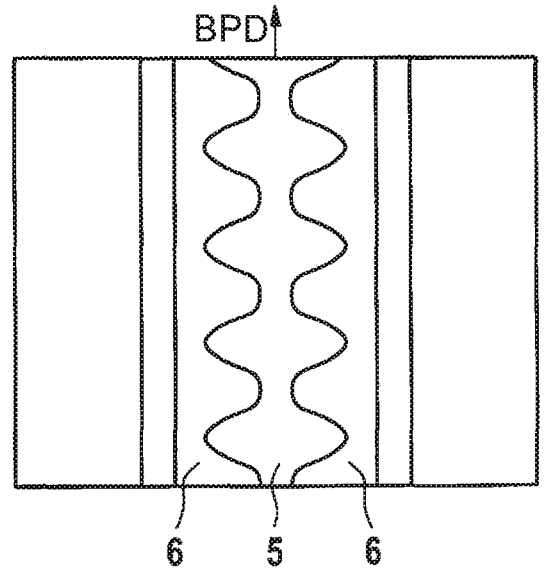
FIG. 6 shows a schematic illustration of a plan view of a fourth exemplary embodiment of an optical phase shifter according to the present invention having serpentine-type N-P-N doping.

FIG. 6 shows a schematic illustration of a plan view of a fourth exemplary embodiment of an optical phase shifter according to the present invention, which features serpentine-type N-P-N doping. Both the first region 5 and second regions 6 thus meander in the way of a serpentine, or in other words, along meandering lines, along the BPD. In this way, the two PN-type junctions of the optical phase shifter are once again considerably extended in this fourth exemplary embodiment.

Figure 7:
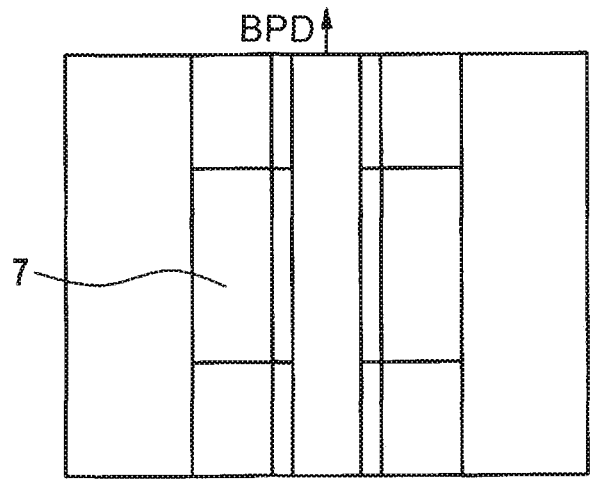
FIG. 7 shows a schematic illustration, in a plan view, of a fifth exemplary embodiment of an optical phase shifter according to the present invention, which has periodically disposed areas having an intrinsic charge carrier density.

FIG. 7 shows a schematic illustration of a plan view of a fifth exemplary embodiment of an optical phase shifter according to the present invention, which has periodically disposed areas having an intrinsic charge carrier density 7. In this fifth exemplary embodiment, the areas having intrinsic charge carrier density 7 are not realized in the form of continuous strips, i.e., as uninterrupted strips running parallel to the BPD or along the BPD, as in the second exemplary embodiment shown in FIG. 5, but in the form of uninterrupted strips, i.e., islands, which are disposed one behind the other along the BPD.

What is claimed is:

1. An optical phase shifter, comprising:
   an optical waveguide formed in a substrate and having an optical conduction surface within the substrate;
   wherein the optical conduction surface includes at least one first region having a first doping and at least two second regions having a second doping that differs from the first doping, the first region being situated between the two second regions; and
   at least one first area and at least one second area having a respective intrinsic charge carrier density, wherein a first one of the two second regions does not touch the first region and is linked to the first region via the at least one first area, and wherein a second one of the two second regions does not touch the first region and is linked to the first region via the at least one second area.

2. The optical phase shifter as recited in claim 1, wherein the first region and the two second regions are disposed in alternation along a direction perpendicular to a beam propagation direction.

3. The optical phase shifter as recited in claim 2, wherein the first region and the two second regions extend at least partially within the optical conduction surface along the beam propagation direction.

4. The optical phase shifter as recited in claim 1, wherein: at least one of (i) the first region overlaps with at least one of the second regions along a direction perpendicular to a beam propagation direction, and (ii) the first region abuts at least one of the second regions along a direction perpendicular to the beam propagation direction.

5. The optical phase shifter as recited in claim 1, wherein the at least one first area and the at least one second area extend continuously along the first region and the at least one of the second regions along a direction extending parallel to a beam propagation direction.

6. The optical phase shifter as recited in claim 1, wherein the at least one first area and the at least one second area extend along a direction running parallel to a beam propagation direction at a distance from one another along the first region and the at least one of the second regions.

7. The optical phase shifter as recited in claim 1, further comprising:

at least two electrical connections to which a voltage is able to be applied and which are connected to at least one of the first and the two second regions in each case in an electrically conductive manner.

8. The optical phase shifter as recited in claim 7, further comprising:
a doped optical junction element via which the first region is linked to one of the electrical connections.

9. The optical phase shifter as recited in claim 1, wherein at least one of the first and the two second regions has a serpentine-type characteristic along a direction that extends parallel to a beam propagation direction.

* * * * *